(12) United States Patent
Futaki et al.

(10) Patent No.: US 7,822,132 B2
(45) Date of Patent: Oct. 26, 2010

(54) OFDM COMMUNICATION SYSTEM

(75) Inventors: Hisashi Futaki, Tokyo (JP); Yoshikazu Kakura, Tokyo (JP); Shousei Yoshida, Tokyo (JP); Takumi Ito, Tokyo (JP)

(73) Assignee: NEC Corporation, Tokyo (JP)

( * ) Notice: Subject to any disclaimer, the term of this patent is extended or adjusted under 35 U.S.C. 154(b) by 766 days.

(21) Appl. No.: 11/718,510

(22) PCT Filed: Oct. 31, 2005

(86) PCT No.: PCT/JP2005/019997
§ 371 (c)(1),
(2), (4) Date: May 2, 2007

(87) PCT Pub. No.: WO2006/049123
PCT Pub. Date: May 11, 2006

(65) Prior Publication Data
US 2008/0152028 A1 Jun. 26, 2008

(30) Foreign Application Priority Data
Nov. 2, 2004 (JP) .............................. 2004-319241

(51) Int. Cl.
*H04K 1/10* (2006.01)
(52) U.S. Cl. .................. 375/260; 375/267; 375/299; 375/347; 375/349
(58) Field of Classification Search .............. 375/260, 375/267, 299, 347, 349
See application file for complete search history.

(56) References Cited
U.S. PATENT DOCUMENTS

| | | | |
|---|---|---|---|
| 6,904,283 B2 * | 6/2005 | Li et al. ................. | 455/450 |
| 7,321,563 B2 * | 1/2008 | Kim et al. ............... | 370/252 |
| 2005/0025039 A1 * | 2/2005 | Hwang et al. ........... | 370/206 |
| 2008/0108310 A1 * | 5/2008 | Tong et al. .............. | 455/69 |

FOREIGN PATENT DOCUMENTS

| | | |
|---|---|---|
| JP | 11-055210 A | 2/1999 |
| JP | 2001-148678 A | 5/2001 |
| JP | 2001-238269 A | 8/2001 |
| JP | 2003-060609 A | 2/2003 |
| JP | 2003-152671 A | 5/2003 |
| JP | 2003-158500 A | 5/2003 |
| JP | 2001-169036 A | 6/2003 |
| JP | 2003-304214 A | 10/2003 |
| JP | 2004-104293 A | 4/2004 |
| JP | 2004-104574 A | 4/2004 |

* cited by examiner

*Primary Examiner*—Shuwang Liu
*Assistant Examiner*—Kabir A Timory
(74) *Attorney, Agent, or Firm*—Dickstein, Shapiro, LLP.

(57) ABSTRACT

N sub-carriers are grouped in units of predetermined quantities in order beginning with the one exhibiting the highest communication channel quality to generate an optimal group pattern on the reception side. Then, communication channel information is calculated for each of sub-carrier groups in the optimal group pattern or a quasi-optimal group pattern which is assumed to be closest to the optimal group pattern among a plurality of previously set group pattern candidates. Communication channel information is designated as modified communication channel information. Grouping information indicative of the optimal group pattern or quasi-optimal group pattern is combined with modified communication channel information to generate feedback information. On the transmission side, sub-carriers are grouped based on reproduced feedback information reproduced from the feedback information.

33 Claims, 14 Drawing Sheets

| SUB-CARRIER GROUP NUMBER | Gr#1 | Gr#2 | Gr#3 | Gr#4 |
|---|---|---|---|---|
| SUB-CARRIER NUMBER | SC#2,3,4,15 | SC#5,6,14,16 | SC#1,7,12,13 | SC#8,9,10,11 |

Fig. 2
PRIOR ART

| Gr#1 | Gr#2 | □ □ □ | Gr#m | □ □ □ | Gr#M |

SUB-CARRIER　#1~n　#n+1~2n　　#(m-1)n+1~mn　　#N-n+1~N

| SUB-CARRIER GROUP NUMBER | Gr#1 | Gr#2 | Gr#3 | Gr#4 |
|---|---|---|---|---|
| SUB-CARRIER NUMBER | SC#2,3,4,15 | SC#5,6,14,16 | SC#1,7,12,13 | SC#8,9,10,11 |

| SUB-CARRIER GROUP NUMBER | Gr#1 | Gr#2 | Gr#3 | Gr#4 |
|---|---|---|---|---|
| SUB-CARRIER NUMBER | SC#1,2,3,16 | SC#5,6,7,8 | SC#10,11,12,15 | SC#4,9,13,14 |

Fig. 9

| CANDIDATE NUMBER | Gr#1 | Gr#2 | Gr#3 | Gr#4 |
|---|---|---|---|---|
| #1 | 1,2,3,4 | 5,6,7,8 | 9,10,11,12 | 13,14,15,16 |
| #2 | 1,2,15,16 | 6,7,8,9 | 10,11,12,13 | 3,4,5,14 |
| #3 | 1,2,9,10 | 3,4,5,6 | 11,12,15,16 | 7,8,13,14 |
| --- | --- | --- | --- | --- |

Fig. 10

| INDEX NUMBER | MATCHING INDEX |
|---|---|
| #1 | AVERAGE DIFFERENT SUB-CARRIER QUANTITY |
| #2 | MAXIMUM DIFFERENT SUB-CARRIER QUANTITY |
| #3 | MINIMUM DIFFERENT SUB-CARRIER QUANTITY |
| #4 | VARIANCE OF DIFFERNT SUB-CARRIER QUANTITY |

Fig. 11

DIFFERENT SUB-CARRIER QUANTITY

| CANDIDATE NUMBER | Gr#1 | Gr#2 | Gr#3 | Gr#4 |
|---|---|---|---|---|
| #1 | 1 | 0 | 2 | 1 |
| #2 | 0 | 0 | 1 | 1 |
| #3 | 1 | 1 | 1 | 1 |
| #4 | 0 | 1 | 0 | 1 |
| #5 | 1 | 1 | 0 | 1 |

Fig. 12

| CANDIDATE NUMBER | #1 | #2 | #3 | #4 | #5 |
|---|---|---|---|---|---|
| MAXIMUM DIFFERENT SUB-CARRIER QUANTITY | 2 | 1 | 1 | 1 | 1 |
| AVERAGE DIFFERENT SUB-CARRIER QUANTITY | - | 0.5 | 1 | 0.5 | 0.75 |
| MINIMUM DIFFERENT SUB-CARRIER QUANTITY | - | 0 | - | 0 | - |
| VARIANCE OF DIFFERENT SUB-CARRIER QUANTITY | - | 0.5 | - | 0.5 | - |

Fig. 13

DIFFERENT SUB-CARRIER QUANTITY

| CANDIDATE NUMBER | Gr#1 | Gr#2 | Gr#3 | Gr#4 |
|---|---|---|---|---|
| #1 | 0 | 1 | 1 | 1 |
| #2 | 1 | 2 | 0 | 1 |
| #3 | 1 | 0 | 0 | 1 |
| #4 | 2 | 0 | 2 | 0 |
| #5 | 1 | 1 | 1 | 1 |

Fig. 14

| MATCHING INDEX \ CANDIDATE NUMBER | #1 | #2 | #3 | #4 | #5 |
|---|---|---|---|---|---|
| MAXIMUM DIFFERENT SUB-CARRIER QUANTITY | 1 | 2 | 1 | 2 | 1 |
| AVERAGE DIFFERENT SUB-CARRIER QUANTITY | 0.75 | - | 0.5 | - | 1 |

Fig. 16

| SUB-CARRIER NUMBER (SC#) | 1 | 2 | 3 | 4 | 5 | 6 | 7 | 8 |
|---|---|---|---|---|---|---|---|---|
| COMMUNICATION CHANNEL QUALITY (ABSOLUTE VALUE OF COMMUNICATION CHANNEL GAIN) | 1.2 | 1.0 | 0.8 | 0.6 | 0.9 | 1.1 | 0.7 | 0.5 |

Fig. 17

| CANDIDATE NUMBER | Gr#1 | | Gr#2 | | Gr#3 | | Gr#4 | |
|---|---|---|---|---|---|---|---|---|
| | SC# | QUALITY OF COMMUNICATION CHANNEL | SC# | QUALITY OF COMMUNICATION CHANNEL | SC# | QUALITY OF COMMUNICATION CHANNEL | SC# | QUALITY OF COMMUNICATION CHANNEL |
| #1 | 1,2 | 1.1 | 3,4 | 0.7 | 5,6 | 1.0 | 7,8 | 0.6 |
| #2 | 3,4 | 0.7 | 5,6 | 1.0 | 7,8 | 0.6 | 1,2 | 1.1 |
| #3 | 5,6 | 1.0 | 7,8 | 0.6 | 1,2 | 1.1 | 3,4 | 0.7 |
| #4 | 7,8 | 0.6 | 1,2 | 1.1 | 3,4 | 0.7 | 5,6 | 1.0 |
| #5 | 1,2 | 1.1 | 5,6 | 1.0 | 3,4 | 0.7 | 7,8 | 0.6 |
| #6 | 1,6 | 1.15 | 2,5 | 0.95 | 3,7 | 0.75 | 4,8 | 0.55 |

Fig. 18

QUALITY DIFFERENCE BETWEEN GROUPS

| CANDIDATE NUMBER | Gr#1-#2 | Gr#2-#3 | Gr#3-#4 |
|---|---|---|---|
| #5 | 0.1 | 0.3 | 0.1 |
| #6 | 0.2 | 0.2 | 0.2 |

OFDM COMMUNICATION SYSTEM

TECHNICAL FIELD

The present invention relates to an OFDM (Orthogonal Frequency Division Multiplexing) communication system which transmits information data series using a plurality of sub-carriers, and more particularly, to an OFDM communication system which has a function of returning feedback information from a reception side to a transmission side for improving communication performance.

BACKGROUND ART

OFDM is a multi-carrier communication scheme for transmitting information data using a plurality of sub-carriers. In OFDM, the respective sub-carriers differ from one another in communication channel quality (received power, transmission error rate and the like) due to the environments of the communication channels (transmission channels). Accordingly, a method is known that measures the quality of the respective communication channels on the reception side, generates feedback information for each sub-carrier based on the measurement results, and returns the feedback information to the transmission side, thereby improving the communication performance.

However, such a method suffers from a problem of reduced information data transmission efficiency due to the amount of feedback information which increases in proportion to the number of sub-carriers. Thus, there is a technique for reducing the amount of feedback information, in which a sub-carrier grouping is previously performed on the transmission side for collecting a plurality of adjacent sub-carriers into one group, and feedback information is generated for each sub-carrier group on the reception side (see, for example, Japanese Patent Laid-Open No. 2003-169036).

In the following, a description will be given of a conventional OFDM communication system which groups sub-carriers with reference to FIG. 1.

As illustrated in FIG. 1, the conventional OFDM communication system has first communication device 501 comprising first transmitter 503 and first receiver 504, and second communication device 502 comprising second transmitter 506 and second receiver 505.

First transmitter 501 has OFDM signal generator 507 for grouping sub-carriers to generate an OFDM signal which is a transmission signal, and adaptive controller 508 for instructing link adaptation which is executed for each sub-carrier by OFDM signal generator 507.

Second receiver 505 has information reproduction unit 509 for reproducing information data from a received OFDM signal and for measuring a communication channel quality, and feedback information generator 510 for generating feedback information based on the result of measuring the communication channel quality (communication channel information) supplied from information reproduction unit 509.

OFDM signal generator 507 included in first transmitter 501 groups information data $S_{TDAT}$ on N (N is an integer equal to or larger than two) sub-carriers in units of n (n is an arbitrary divisor of N) in order beginning with the first sub-carrier to generate M (M=N/n) sub-carrier groups. OFDM signal generator 507 also executes the link adaptation specified by control information $S_{CTRL}$ to set a transmission parameter for each sub-carrier group, and generates transmission OFDM signal $S_{TX}$ which is then transmitted to second communication device 502.

The link adaptation executed by OFDM signal generator 507 includes adaptive modulation control which assigns more multi-level values for symbol modulation to sub-carriers which belong to a sub-carrier group that exhibits a higher communication channel quality, or transmission power control which allocates larger transmission power to sub-carriers which belong to a sub-carrier group that exhibits a lower communication channel quality, or the like.

Information reproduction unit 509 included in second receiver 505 reproduces information data from received OFDM signal $S_{RX}$ and delivers the reproduced information data as $S_{RDAT}$. Information reproduction unit 509 also generates communication channel information $S_{CEO}$ from received OFDM signal $S_{RX}$ for each sub-carrier group.

Feedback information generator 510 generates feedback information $S_{TFBO}$ for previously set sub-carrier groups based on communication channel information $S_{CEO}$ generated from information reproduction unit 509. Second transmitter 506 generates transmission feedback signal $S_{FBTX}$ including feedback information $S_{TFBO}$, which is transmitted to first communication device 501.

First receiver 504 receives transmission feedback signal $S_{FBTX}$ transmitted from second transmitter 506 (received feedback signal $S_{VBRX}$), reproduces feedback information $S_{TFBO}$ from received feedback signal $S_{FBRX}$ (reproduced feedback information $S_{RFBO}$), and supplies reproduced feedback information $S_{RFBO}$ to adaptive controller 508 of first transmitter 503.

Adaptive controller 508 selects link adaptation for improving the communication channel quality for each sub-carrier group based on reproduced feedback information $S_{RFBO}$, and supplies OFDM signal generator 507 with control information $S_{CTRL}$ including the selection result.

In this way, the conventional OFDM communication system reduces the amount of feedback information supplied from the reception side to the transmission side by generating feedback information for each sub-carrier group. Also, communication performance is improved by executing link adaptation for improving communication channel quality based on reproduced feedback information $S_{RFBO}$.

However, in the conventional OFDM communication system described above, a group pattern indicative of a correspondence relationship between each sub-carrier and sub-carriers included therein remains fixed in a previously set relationship at all times. Therefore, if a difference develops between the communication channel quality of a sub-carrier group and the communication channel qualities of the respective sub-carriers included therein, a problem arises in that appropriate feedback information is not generated in accordance with the communication channel qualities of the sub-carriers.

In addition, since the link adaptation determined by the adaptive controller does not either correspond to the communication channel qualities of the sub-carriers, a problem arises in that communication performance is largely degraded as compared with the case where optimal link adaptation is executed.

DISCLOSURE OF THE INVENTION

It is therefore an object of the present invention to provide an OFDM communication system which is capable of returning optimal feedback information from a reception side to a transmission side.

Also, it is another object of the present invention to provide an OFDM communication system which is capable of returning optimal feedback information from a reception side to a transmission side while limiting the amount of information.

To achieve the above objects, in the present invention, N sub-carriers are grouped in units of n (n is an arbitrary divisor of N) into M (M=N/n) groups in order beginning with the one exhibiting the highest communication channel quality to generate an optimal group pattern on the reception side.

Then, the result of calculations carried out for each of M sub-carrier groups in the optimal group pattern based on the communication channel information is designated as modified communication channel information, and grouping information (information indicative of a correspondence relationship between the sub-carrier groups and sub-carriers belonging to the sub-carrier groups) is combined with the modified communication channel information to generate feedback information.

On the transmission side, sub-carriers are grouped based on reproduced feedback information reproduced from the feedback information.

In a first OFDM communication system as described above, since the sub-carriers are grouped beginning with the one exhibiting the highest communication channel quality, a difference in communication channel quality is reduced between each sub-carrier group and sub-carriers belonging thereto, and the modified communication channel information generated for each sub-carrier group is also commensurate with the communication channel quality of each sub-carrier. Also, link adaptation is executed in conformity with the communication channel quality of each sub-carrier.

Further, the present invention proposes the following second and third OFDM communication systems as methods of reducing the amount of feed-back information indicative of a group pattern.

The second OFDM communication system of the present invention groups N sub-carriers in units of n (n is an arbitrary divisor of N) into M (M=N/n) groups in order beginning with the one exhibiting the highest communication channel quality to generate an optimal group pattern on the reception side.

Then, a plurality of group pattern candidates are generated in a quantity equal to or less than the quantity of group patterns which can be assumed from the total quantity N of sub-carriers and the quantity n of sub-carriers per sub-carrier group, and the group pattern candidate closest to the optimal group pattern is designated as a quasi-optimal group pattern. Further, the quasi-optimal group pattern or a quasi-optimal candidate number, which is a candidate number thereof, is designated as grouping information. The grouping information is combined with modified communication channel information to generate feedback information. The modified communication channel information shows the result of calculations carried out for each of sub-carrier groups in the quasi-optimal group pattern based on communication channel information.

On the transmission side, sub-carriers are grouped based on the quasi-optimal group pattern reproduced from the feedback information. Alternatively, the quasi-optimal group pattern is reproduced based on the quasi-optimal candidate number, and the sub-carriers are grouped based thereon.

In the second OFDM communication system as described above, since the sub-carriers are grouped based on the quasi-optimal group pattern closest to the optimal group pattern, a difference in communication channel quality is reduced between each sub-carrier group and sub-carriers belonging thereto, and the modified communication channel information generated for each sub-carrier group is also commensurate with the communication channel quality of each sub-carrier. Also, link adaptation is executed in conformity with the communication channel quality of each sub-carrier.

In the third OFDM communication system of the present invention, on the other hand, a plurality of group pattern candidates are generated in a quantity equal to or less than the quantity of group patterns which can be assumed from the total quantity N of sub-carriers and the quantity n of sub-carriers per sub-carrier group on the reception side. The communication channel quality is measured for all group pattern candidates, and a group pattern candidate exhibiting the largest difference in communication channel quality between sub-carrier groups in each group pattern candidate is designated as a quasi-optimal group pattern. Further, the quasi-optimal group pattern or a quasi-optimal candidate number, which is a candidate number thereof, is designated as grouping information. The grouping information is combined with modified communication channel information to generate feedback information. The modified communication channel information shows the result of calculations carried out for each of sub-carrier groups in the quasi-optimal group pattern based on communication channel information.

On the transmission side, sub-carriers are grouped based on the quasi-optimal group pattern reproduced from the feedback information. Alternatively, the quasi-optimal group pattern is reproduced based on the quasi-optimal candidate number, and the sub-carriers are grouped based thereon.

In the third OFDM communication system as described above, since the sub-carriers are grouped based on the quasi-optimal group pattern in a manner similar to the second embodiment, a difference in communication channel quality is reduced between each sub-carrier group and sub-carriers belonging thereto, and the modified communication channel information generated for each sub-carrier group is also commensurate with the communication channel quality of each sub-carrier. Also, link adaptation is executed in conformity to the communication channel quality of each sub-carrier.

Further, when the quasi-optimal candidate number indicative of the quasi-optimal group pattern, among the previously generated group pattern candidates, is transmitted to the transmission side, the amount of feedback information can be reduced.

According to the present invention, the difference in communication channel quality is reduced between each sub-carrier group and sub-carriers belonging thereto, and the modified communication channel information generated for each sub-carrier group is also commensurate with the communication channel quality of each sub-carrier. Therefore, optimal feedback information can be returned from the reception side to the transmission side. Also, link adaptation is executed in conformity to the communication channel quality of each sub-carrier.

In addition, when the quasi-optimal candidate number indicative of the quasi-optimal group pattern, among the previously generated group pattern candidates, is transmitted to the transmission side, the amount of feedback information can be reduced.

BRIEF DESCRIPTION OF THE DRAWINGS

FIG. 2 is a schematic diagram showing an example of sub-carrier grouping performed by the OFDM communication system illustrated in FIG. 1.

FIG. 9 is a schematic diagram showing a specific example of pattern candidates used in the OFDM communication system illustrated in FIG. 6.

FIG. 10 is a table showing exemplary matching indexes used in the processing the matching unit illustrated in FIG. 7.

FIG. 11 is a table showing a specific example of a different sub-carrier quantity in each group pattern candidate, used in the processing the matching unit illustrated in FIG. 7.

FIG. 12 is a table showing specific examples of matching indexes for each group pattern candidate, used in the processing the matching unit illustrated in FIG. 7.

FIG. 13 is a table showing another specific example of a different sub-carrier quantity in each group pattern candidate, used in the processing the matching unit illustrated in FIG. 7.

FIG. 14 is a table showing other specific examples of matching indexes for each group pattern candidate, used in the processing the matching unit illustrated in FIG. 7.

FIG. 16 is a table showing a specific example of the communication channel quality measured for each sub-carrier, used in the OFDM communication system illustrated in FIG. 15.

FIG. 17 is a table showing a specific example of sub-carrier numbers included in each sub-carrier group of a group pattern candidate, and the average value of the communication channel quality in the sub-carrier group, used in the OFDM communication system illustrated in FIG. 15.

FIG. 18 is a table showing a specific example of differences in communication channel quality between sub-carrier groups in group pattern candidates, used in the OFDM communication system illustrated in FIG. 15.

BEST MODE FOR CARRYING OUT THE INVENTION

First Embodiment

Figure 1:
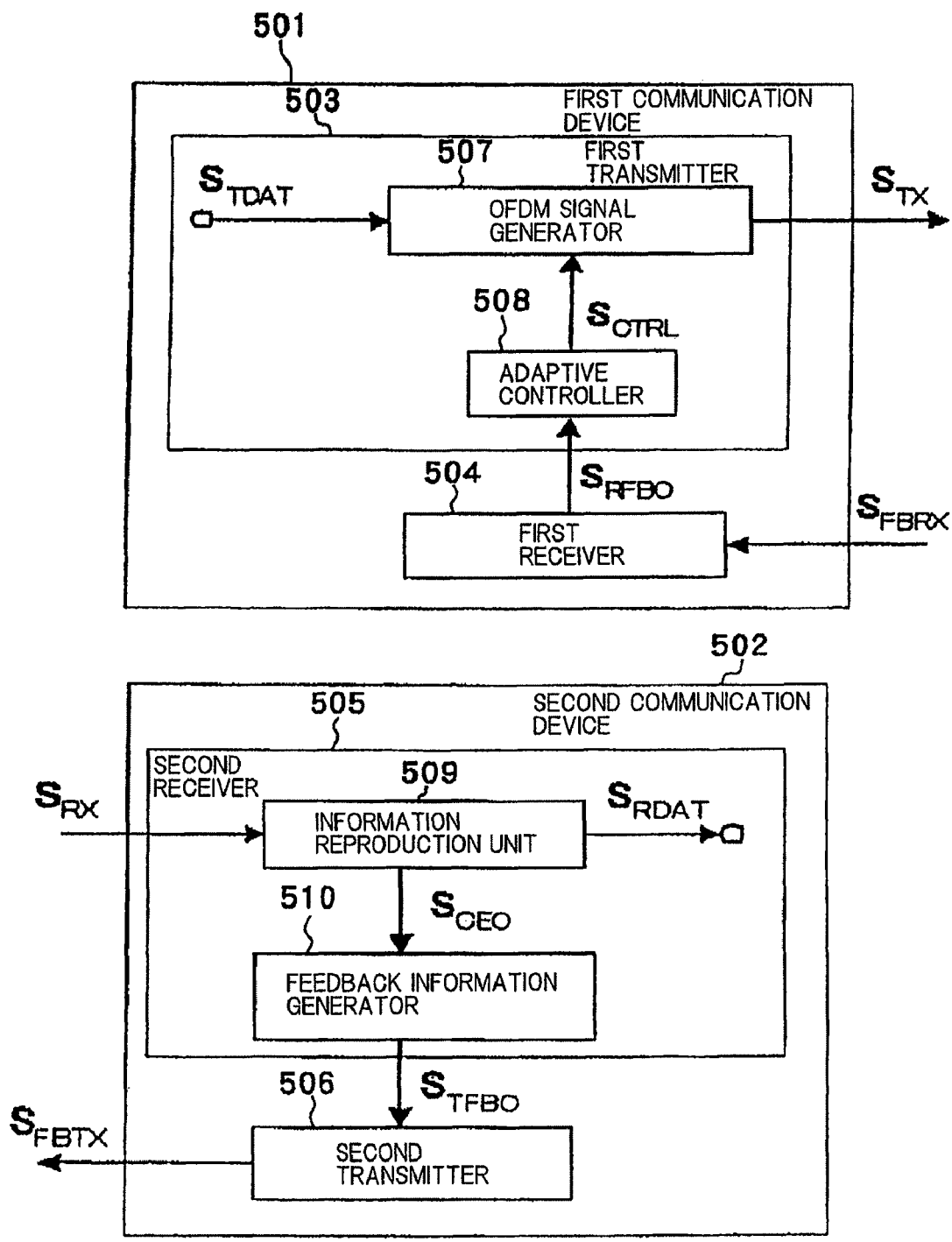
FIG. 1 is a block diagram illustrating the configuration of a conventional OFDM communication system.
Figure 3:
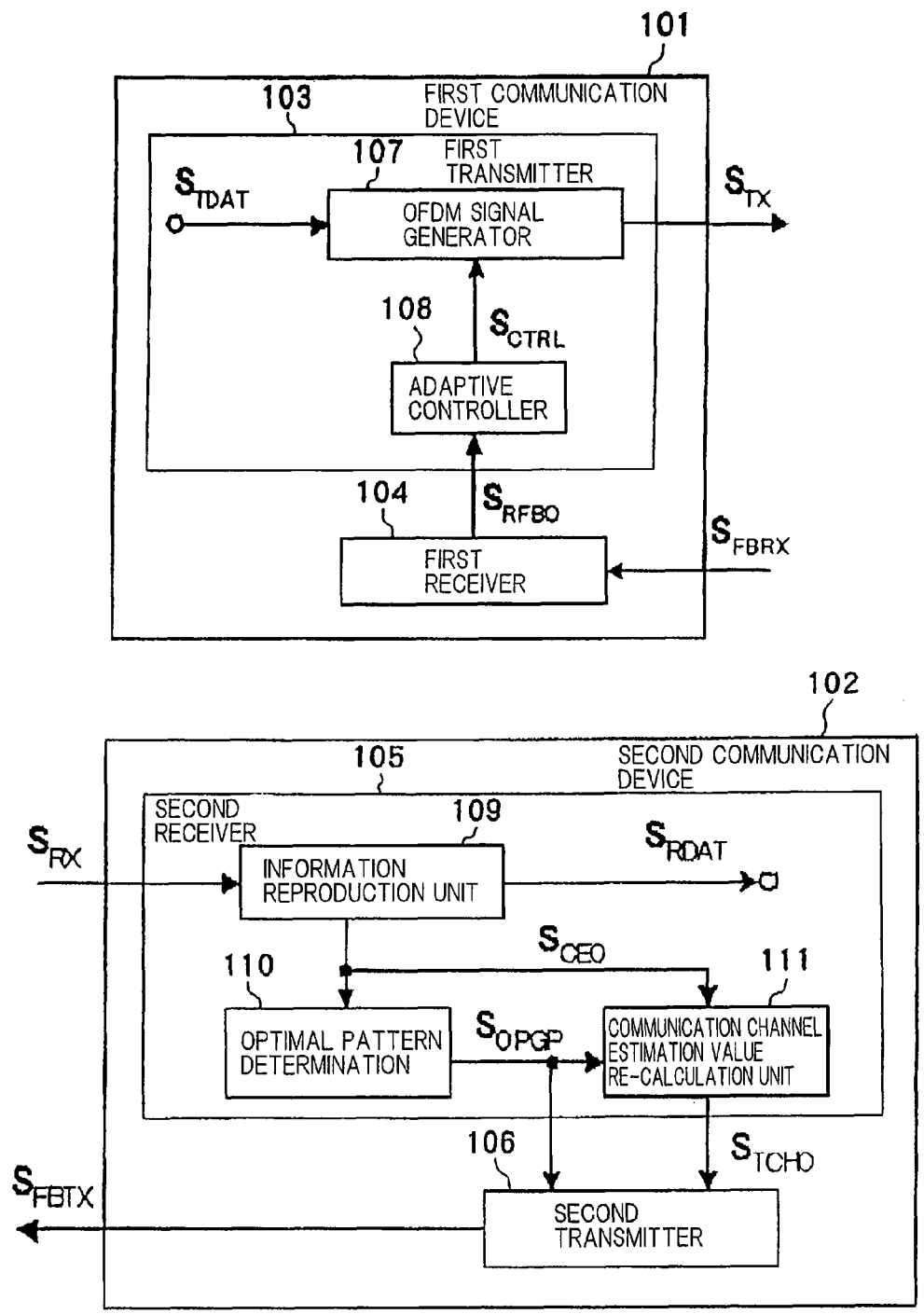
FIG. 3 is a block diagram illustrating the configuration of a first embodiment of an OFDM communication system according to the present invention.

As illustrated in FIG. 3, an OFDM communication system of a first embodiment has first communication device 101 comprising first transmitter 103 and first receiver 104, and second communication device 102 comprising second transmitter 106 and second receiver 105.

First transmitter 103 comprises OFDM signal generator 107 and adaptive controller 108. Second receiver 105 comprises information reproduction unit 109, optimal pattern determination unit 110, and communication channel estimation value re-calculation unit 111.

OFDM signal generator 107 of first transmitter 101 groups information data $S_{TDAT}$ on N (N is an integer equal to or larger than two) sub-carriers in units of n (n is an arbitrary divisor of N) based on control information $S_{CTRL}$ supplied from adaptive controller 018 to generate M (M=N/n) sub-carrier groups. OFDM signal generator 107 also executes link adaptation specified by control information $S_{CTRL}$ supplied from adaptive controller 108 to set a transmission parameter for each sub-carrier group, and generates transmission OFDM signal $S_{TX}$ which is transmitted to second communication device 102. Each sub-carrier group is labeled with group number m (m=1, 2, . . . , M).

Examples of link adaptation executed by OFDM signal generator 107 include adaptive modulation control which assigns more multi-level values for symbol modulation to sub-carriers which belong to a sub-carrier group that exhibits a higher communication channel quality, or include transmission power control which allocates larger transmission power to sub-carriers which belong to a sub-carrier group that exhibits a lower communication channel quality, or the like.

Information reproduction unit 109 of second receiver 105 reproduces information data from received OFDM signal $S_{RX}$, and delivers the reproduced information data as $S_{RDAT}$. Information reproduction unit 109 also generates communication channel information $S_{CEO}$ for each sub-carrier from received OFDM signal $S_{RX}$.

Optimal pattern determination unit 110 groups N sub-carriers in units of n in decreasing order of the communication channel quality based on communication channel information $S_{CEO}$ supplied from information reproduction unit 109 to determine an optimal group pattern (hereinafter called the "optimal group pattern"), and delivers information on the optimal group pattern as grouping information $S_{OPGP}$.

Communication channel estimation value re-calculation unit 111 generates communication channel information (modified communication channel information $S_{TCHO}$) calculated for each sub-carrier group in the optimal group pattern based on communication channel information $S_{CEO}$ and grouping information $S_{OPGP}$.

Second communication device 106 generates feedback information including grouping information $S_{OPGP}$ and modified communication channel information $S_{TCHO}$, and transmits transmission feedback signal $S_{FBTX}$ containing the feedback information to first communication device 101.

First receiver 104 receives transmission feedback signal $S_{FBTX}$ (received feedback signal $S_{FBRX}$) transmitted from second transmitter 106, reproduces feedback information $S_{TFBO}$ (reproduced feedback information $S_{RFBO}$) from received feedback signal $S_{FBRX}$, and supplies feedback information $S_{TFBO}$ to adaptive controller 108 of first transmitter 103.

Adaptive controller 108 selects optimal link adaptation for each sub-carrier group based on the modified communication channel information in reproduced feedback information $S_{RFBO}$. Then, adaptive controller 108 supplies OFDM signal generator 107 with control information $S_{CTRL}$ including the selection result and grouping information for grouping the respective sub-carriers.

As described above, optimal pattern determination unit 110 in this embodiment groups N (N is an integer equal to or larger than two) sub-carriers in units of n (n is an arbitrary divisor of N) in order beginning with the one exhibiting the highest communication channel quality, and determines an optimal group pattern comprised of M sub-carrier groups which have sub-carrier group numbers m (m=1, 2, . . . , M, M=N/n).

Grouping information $S_{OPGP}$ indicative of the optimal group pattern may include, for example, information which relates numbers $m_1, m_2, \ldots, m_N$ ($m_1, m_2, \ldots, m_N$ are integers equal to or larger than one and equal to or smaller than M) of sub-carrier groups to which sub-carriers 1, 2, . . . , N belong, or numbers of n sub-carriers included in each of M sub-carrier groups.

Next, a method of determining the optimal group pattern by the OFDM communication system of the first embodiment will be specifically described with reference to FIGS. 4 and 5. It should be noted that FIGS. 4 and 5 illustrate the case where the quantity of sub-carriers N is equal to 16 (N=16), the quantity of sub-carriers n included in each sub-carrier group is equal to four (n=4), and the quantity of sub-carrier groups M is equal to four (M=4).

Figures 4, 5:
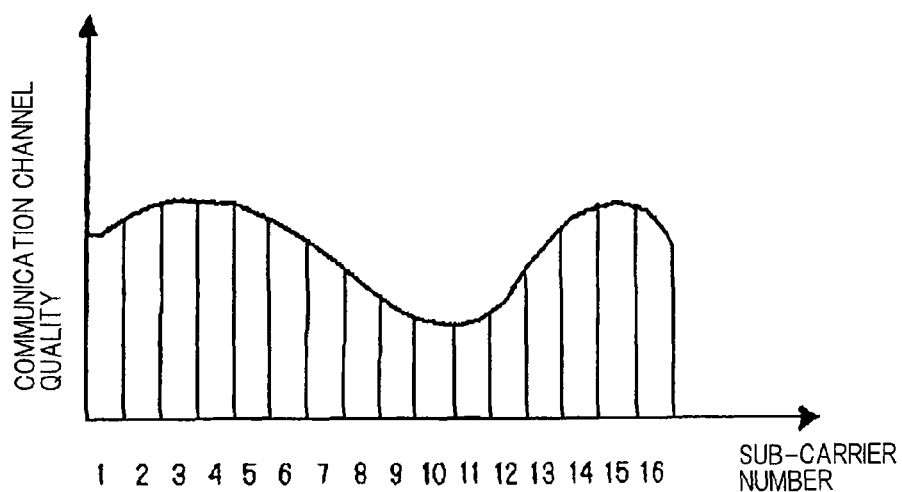
FIG. 4 is a graph showing a specific example of the communication channel quality of each sub-carrier transmitted/received by the OFDM communication system illustrated in FIG. 3.
FIG. 5 is a schematic diagram showing how the sub-carriers that exhibit the communication channel qualities shown in FIG. 4 are assigned to sub-carrier groups, respectively.

FIG. 4 is a graph showing the communication channel quality of each sub-carrier, showing an example in which sub-carriers are labeled with sub-carrier numbers SC# (=3, 4, 15, 2, 5, 14, 16, 6, 1, 13, 7, 12, 8, 9, 10, 11) in order beginning with the sub-carrier which exhibits the highest communication channel quality. FIG. 5 in turn shows how sub-carrier groups are assigned group numbers (Gr#=1-4) in order beginning with the one which exhibits the highest communication channel quality, where each sub-carrier group and sub-carrier numbers included therein are represented by Gr#1:SC#=2, 3, 4, 15; Gr#2:SC#=5, 6, 14, 16; Gr#3:SC#=1, 7, 12, 13; and Gr#4:SC#=8, 9, 10, 11. Assume herein that the relationship between the sub-carrier groups and sub-carriers shown in FIG. 5 presents the optimal group pattern. In this event, grouping information $S_{OPGP}$ employed herein is, for example, information which is a sequence of numbers given to sub-carrier groups to which respective sub-carriers belong, for example, in the order of 1, 2, . . . , 16, {Gr#=3, 1, 1, 1, 2, 2, 3, 4, 4, 4, 3, 3, 2, 1, 2} or is information which is a sequence of numbers given to sub-carriers which belong to the respective sub-carrier groups in the order of Gr#1, Gr#2, Gr#3, Gr#4, {SC#=2, 3, 4, 15, 5, 6, 14, 16, 1, 7, 12, 13, 8, 9, 10, 11}.

According to the OFDM communication system of this embodiment, since the sub-carriers are grouped beginning with the one which exhibits the highest communication channel quality, the difference in quality is reduced between the communication channel quality of each sub-carrier group and the communication channel qualities of sub-carriers belonging to this sub-carrier group, and the modified communication channel information generated for each sub-carrier group also provides information in accordance with the communication channel qualities of the respective sub-carriers. Also, link adaptation is executed in first transmitter 103 in conformity to the communication channel quality of each sub-carrier.

Second Embodiment

As described above, in the first embodiment, N (N is an integer equal to or larger than two) sub-carriers are grouped in units of n (n is an arbitrary divisor of N) in order beginning with the one which exhibits the highest communication channel quality to determine an optimal group pattern which comprises M sub-carrier groups each having sub-carrier group number m (m=1, 2, . . . , M, M=N/n). Then, feedback information including grouping information $S_{OPGP}$ indicative of the optimal group pattern, and modified communication channel information $S_{TCHO}$, which is communication channel information for each of the sub-carrier groups, is sent back from the second communication device on the reception side to the first communication device on the transmission side.

In an OFDM communication system of a second embodiment, a quantity of group pattern candidates equal to or smaller than the quantity of group patterns have been previously prepared in accordance with the quantity N of sub-carriers and the quantity n of sub-carriers per sub-carrier group. Then, one of the group pattern candidates that is closest to an optimal group pattern is determined as a quasi-optimal group pattern, and information for identifying the quasi-optimal group pattern (quasi-optimal candidate number) is sent back from a second communication device on the reception side to a first communication device on the transmission side, thereby reducing the amount of feedback information.

Figure 6:
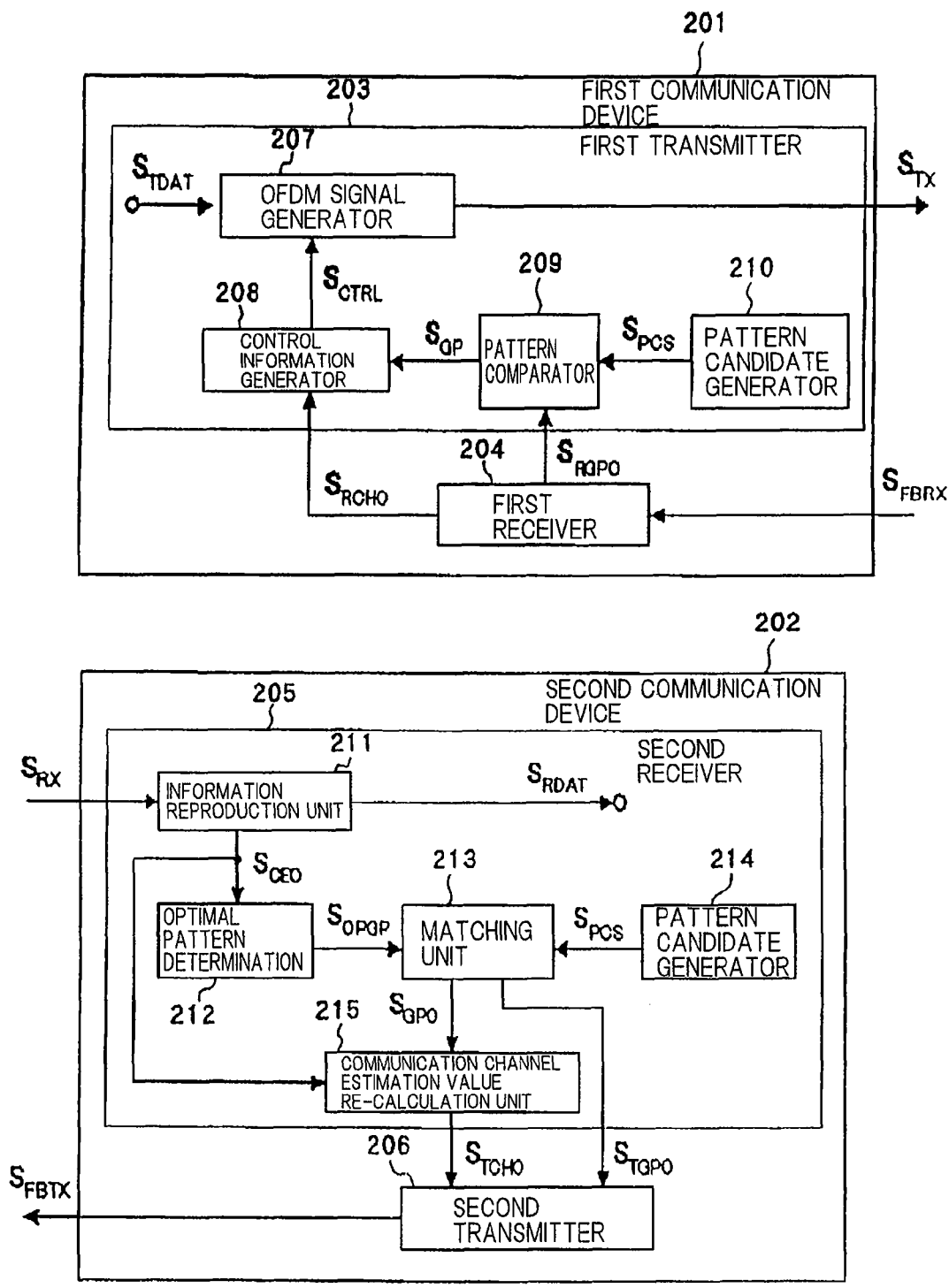
FIG. 6 is a block diagram illustrating the configuration of a second embodiment of the OFDM communication system according to the present invention.

As illustrated in FIG. 6, the OFDM communication system of the second embodiment has first communication device 201 comprising first transmitter 203 and first receiver 204, and second communication device 202 comprising second transmitter 206 and second receiver 205.

First transmitter 203 comprises OFDM signal generator 207, control information generator 208, pattern comparator 209, and pattern candidate generator 210. Second receiver 2025 comprises information reproduction unit 211, optimal pattern determination unit 212, matching unit 213, pattern candidate generator 214, and communication channel estimation value re-calculation unit 215.

OFDM signal generator 207 of first transmitter 201 groups information $S_{TDAT}$ on N (N is an integer equal to or larger than two) sub-carriers based on control information $S_{CTRL}$ supplied from control information generator 208 to generate M (M=N/n) sub-carrier groups. Also, OFDM signal generator 207 executes link adaptation specified by control information $S_{CTRL}$ supplied from control information generator 208 to set a transmission parameter for each sub-carrier group, and generates transmission OFDM signal $S_{TX}$ which is transmitted to second communication device 202. Assume herein that each sub-carrier group is labeled with group number m (m=1, 2, . . . , M).

Examples of link adaptation executed by OFDM signal generator 107 include adaptive modulation control which assigns more multi-level values for symbol modulation to sub-carriers which belong to a sub-carrier group that exhibits a higher communication channel quality, or include transmission power control which allocates larger transmission power to sub-carriers which belong to a sub-carrier group that exhibits a lower communication channel quality, or the like.

Information reproduction unit 211 of second receiver 205 reproduces information data from received OFDM signal $S_{RX}$ to deliver the reproduced information data as $S_{RDAT}$. Information reproduction unit 211 also generates communication channel information $S_{CEO}$ for each sub-carrier group from received OFDM signal $S_{RX}$.

Optimal pattern determination unit 212, as in the first embodiment, groups N (N is an integer equal to or larger than two) sub-carriers in units of n (n is an arbitrary divisor of N) in decreasing order of communication channel quality to determine an optimal group pattern comprised of M sub-carrier groups which have sub-carrier group numbers m (m=1, 2, . . . , M, M=N/n), and delivers determined optimal group pattern $S_{OPGP}$.

Pattern candidate generator 214 generates a pattern candidate set $S_{PCS}$ comprised of group pattern candidates which are labeled with candidate numbers 1 to K (K is an integer equal to or larger than one and equal to or smaller than $N!/(n!)^M$, where M=N/n).

Matching unit 213 compares optimal group pattern $S_{OPGP}$ supplied from optimal pattern determination unit 212 with pattern candidate set $S_{PCS}$ generated by pattern candidate generator 214 to determine the group pattern candidate that is closest to the optimal group pattern as a quasi-optimal group pattern, and delivers this quasi-optimal group pattern $S_{GPO}$ and quasi-optimal candidate number $S_{TGPO}$ which is candidate number k (k is an integer equal to or larger than one and equal to or smaller than K) of quasi-optimal group pattern $S_{GPO}$.

Communication channel estimation value re-calculation unit 111 generates communication channel information (modified communication channel information) calculated for each of the sub-carrier groups in the quasi-optimal group pattern based on communication channel information $S_{CEO}$ supplied from information reproduction unit 211 and quasi-optimal group pattern $S_{GPO}$ determined by matching unit 213.

Second transmitter 206 generates feedback information including quasi-optimal candidate number $S_{TGPO}$ and modified communication channel information $S_{TCHO}$, and transmits transmission feedback signal $S_{FBTX}$ containing the feedback information to first transmitter 201.

First receiver 204 receives transmission feedback signal $S_{FBTX}$ transmitted from second transmitter 206 (received feedback signal $S_{FBRX}$), reproduces reproduced candidate number $S_{RGPO}$ corresponding to quasi-optimal candidate number $S_{TGPO}$ from this received feedback signal $S_{FBRX}$, and supplies reproduced candidate number $S_{RGPO}$ to pattern comparator 209 of first transmitter 203. First receiver 204 also reproduces reproduced communication channel information $S_{RCHO}$ corresponding to modified communication channel information $S_{TCHO}$ from received feedback signal $S_{FBRX}$, and supplies reproduced communication channel information $S_{RCHO}$ to control information generator 208 of first transmitter 203.

Pattern candidate generator 210 generates pattern candidate set $S_{PCS}$ comprised of group pattern candidates which are labeled with candidate numbers 1 to K (K is an integer equal to or larger than one and equal to or smaller than $N!/(n!)^M$, where M=N/n), in a manner similar to pattern candidate generator 214 of second receiver 205.

Pattern comparator 209 compares reproduced candidate number $S_{RGPO}$ with pattern candidate set $S_{PCS}$ supplied from pattern candidate generator 210 to pick up reproduced group pattern $S_{GP}$ that corresponds to the quasi-optimal group pattern.

Control information generator 208 selects optimal link adaptation for each sub-carrier group in the quasi-optimal group pattern based on reproduced communication channel information $S_{RCHO}$. Then, control information generator 208 supplies OFDM signal generator 207 with control information $S_{CTRL}$ including the selection result and reproduced group pattern $S_{GP}$ for grouping the respective sub-carriers.

Figures 7, 8:
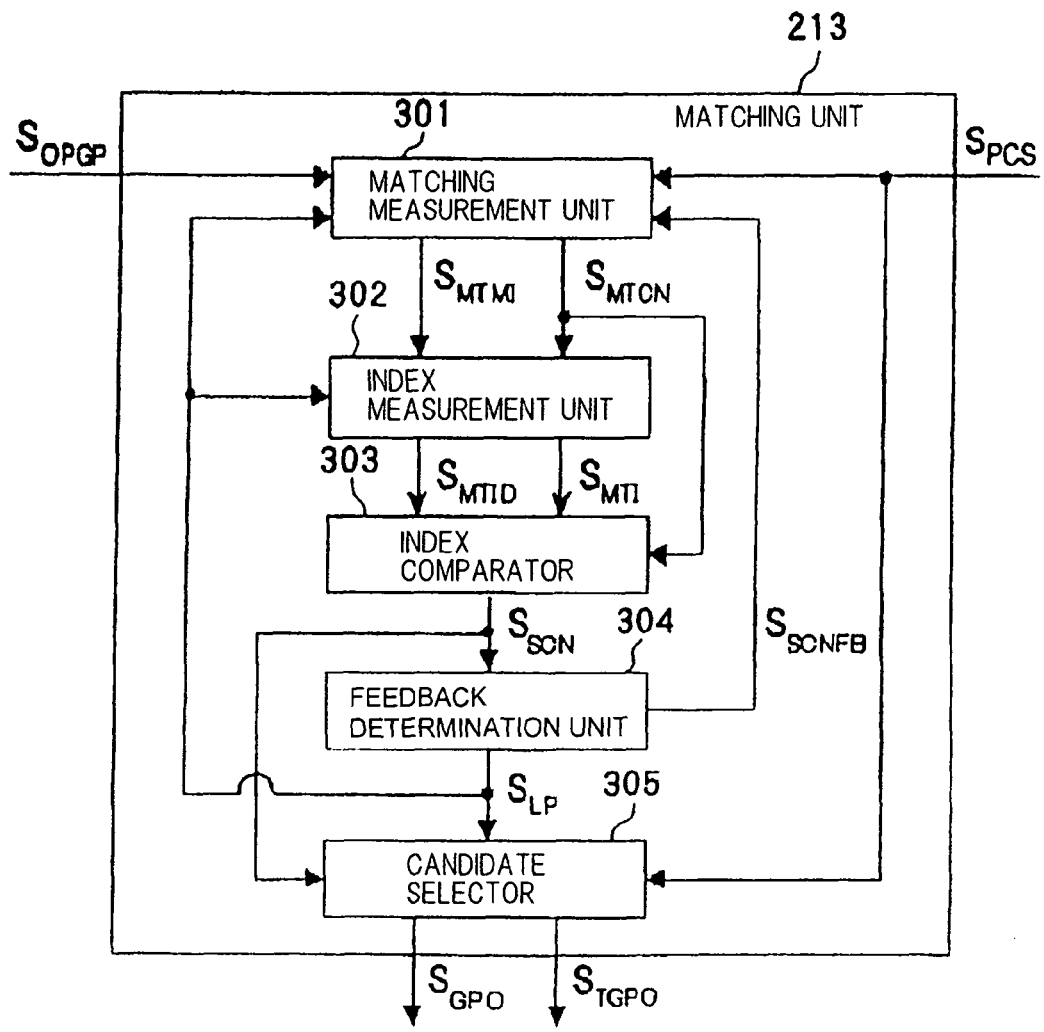
FIG. 7 is a block diagram illustrating an exemplary configuration of a matching unit shown in FIG. 6.
FIG. 8 is a schematic diagram showing a specific example of an optimal group pattern used by the OFDM communication system illustrated in FIG. 6.

FIG. 7 is a block diagram illustrating an exemplary configuration of matching unit 213 shown in FIG. 6.

Matching unit 210 of this embodiment selects a quasi-optimal group pattern closest to the optimal group pattern using a plurality of previously set matching indexes among a plurality of group pattern candidates generated by pattern candidate generator 214. The matching indexes refer to indexes used to group pattern candidates which are maintained as candidates for the quasi-optimal group pattern, and these indexes are given priorities indicative of the order in which they are used in measurements. Matching unit 210 selects the matching indexes one by one in accordance with the priorities, and determines a group pattern candidate which complies with all the selected matching indexes as the quasi-optimal group pattern.

As illustrated in FIG. 7, matching unit 213 comprises matching measurement unit 301, index measurement unit 302, index comparator 303, feedback determination unit 304, and candidate selector 305.

Matching measurement unit 301 selects all group pattern candidates labeled with candidate numbers 1 to K as matching candidate numbers $S_{MTCN}$, when loop count $S_{LP}$ is "0," based on optimal group pattern $S_{OPGP}$ applied from optimal pattern determination unit 212, pattern candidate set $S_{PCS}$ generated by pattern candidate generator 214, feedback candidate number $S_{SCNFB}$ supplied from feedback determination unit 304, and loop count $S_{LP}$. On the other hand, when loop count $S_{LP}$ is equal to or larger than "1," matching measurement unit 301 picks up selected candidate number $S_{SCN}$ (=feedback candidate number $S_{SCNFB}$) that is indicative of the group pattern candidate selected by index comparator 303 as matching candidate number $S_{MTCN}$.

Further, matching measurement unit 301 measures a value indicative of the degree to which each of the group pattern candidates that correspond to matching candidate number $S_{MTCN}$ is close to optimal group pattern $S_{OPGP}$ (proximity), and delivers the measurement result as measured matching value $S_{MTMI}$.

Index measurement unit 302 is applied with loop count $S_{LP}$, matching candidate number $S_{MTCN}$, and measured matching value $S_{MTMI}$, and generates a matching index set which includes previously set matching indexes and index numbers 1 to P (P is an arbitrary integer equal to or larger than L+1, where L is a maximum loop count which is an arbitrary integer equal to or larger than zero). Then, index measurement unit 302 selects a matching index which is given (I+1)th priority, when loop count $S_{LP}$ is I (I is an integer equal to or larger than zero and equal to or smaller than L), and delivers the selected index number $S_{MTID}$. Index measurement unit 302 further calculates a selection index, and delivers the result as calculated index value $S_{MTI}$.

Index comparator 303 selects the candidate number of a group pattern candidate, which satisfies candidate selection criteria indicated by the matching indexes, as selected candidate number $S_{SCN}$, using matching candidate number $S_{MTCN}$, index number $S_{MTID}$, and calculated index value $S_{MTI}$.

Feedback determination unit 304 comprises a counter for counting the number of times that these are loops, and determines based on loop count $S_{LP}$ and selected candidate number $S_{SCN}$ whether or not selected candidate number $S_{SCN}$ should be returned to matching measurement unit 301 as feedback candidate number $S_{SCNFB}$. Specifically, feedback determination unit 304 returns selected candidate number $S_{SCN}$ (=feedback candidate number $S_{SCNFB}$) selected by index comparator 303 to matching measurement unit 301 when there are two or more selected candidate numbers $S_{SCN}$ and when loop count $S_{LP}$ has not reached L. On the other hand, feedback determination unit 304 does not returns selected candidate number $S_{SCN}$ to matching measurement unit 301 when there is one selected candidate number $S_{SCN}$, or when loop count $S_{LP}$ has reached L.

Further, feedback determination unit 304 increments the value of loop counter (initial value of which is zero) $S_{LP}$ by "1" when feedback candidate number $S_{SCNFB}$ is returned to matching measurement unit 301, and resets the value of loop count $S_{LP}$ to "0" when feedback candidate number $S_{SCNFB}$ is not fed back, and delivers the resulting loop count $S_{LP}$.

Candidate selector 305 determines a quasi-optimal group pattern only when loop count $S_{LP}$ is "0" based on loop count $S_{LP}$, selected candidate number $S_{SCN}$, and pattern candidate set $S_{PCS}$, and delivers quasi-optimal group pattern $S_{GPO}$ and quasi-optimal candidate number $S_{TGPO}$. In this connection, when selected candidate numbers $S_{SCN}$ have been narrowed down to one before selecting a quasi-optimal group pattern using all matching indexes, candidate selector 305 determines this as the quasi-optimal group pattern. On the other hand, when two or more selected candidate numbers $S_{SCN}$ still remain even after all the matching indexes have been used, candidate selector 305 selects arbitrary one from these selected candidate numbers $S_{SCN}$, and determines a group pattern candidate that corresponds thereto as the quasi-optimal group pattern.

Through the foregoing processing, the group pattern candidate closest to the optimal group pattern is determined as the quasi-optimal group pattern.

Referring next to FIGS. 8 and 9, a description will be given of a method of measuring the proximity of a group pattern candidate to the optimal group pattern in matching unit 213 illustrated in FIG. 7. In the following description, assume that the total quantity N of sub-carriers is 16 (N=16), the quantity n of sub-carriers included in each sub-carrier group is four (n=4), and the quantity M of sub-carrier groups is four (M=4).

In this embodiment, a different sub-carrier quantity is used as measured matching value $S_{MTMI}$ measured by matching measurement unit 301 and is the quantity of sub-carrier that are the quantity of sub-carrier numbers that are different between a sub-carrier group in a group pattern candidate and a sub-carrier group in the optimal group pattern. For example, when the optimal group pattern is as shown in FIG. 8, and when the pattern candidate set is as shown in FIG. 9, the different sub-carrier quantities between a group pattern candidate labeled with candidate number #1 and the optimal group pattern are {1, 0, 1, 2} in the order of sub-carrier number Gr# 1, 2, 3, 4.

FIGS. 10-14 are diagrams for determining the order of determining the quasi-optimal group pattern in matching unit 213.

In this embodiment, as shown in FIG. 10, the matching indexes include an average different sub-carrier quantity which is the average of the aforementioned different sub-carrier quantities, a maximum different sub-carrier quantity which is a maximum of the different sub-carrier quantities, a minimum different sub-carrier quantity which is a minimum of the different sub-carrier quantities, and a variance of the different sub-carrier quantities, and they are labeled with index numbers 1, 2, 3, 4 in this order. These matching indexes have been previously and arbitrarily given priorities which indicate the order in which they are used for selecting the quasi-optimal group pattern. Assume herein that higher priorities are given to the maximum different sub-carrier quantity, to the average different sub-carrier quantity, to the minimum different sub-carrier quantity, and to the variance of different sub-carrier quantities in this order. Further, the maximum loop count L is set to three (L=3).

Referring first to FIGS. 11 and 12, a description will be given of a first example of a method of determining a quasi-optimal group pattern by matching unit 213. FIG. 11 shows the quantity of different sub-carriers in each group pattern candidate when the quantity K of group pattern candidates included in a pattern candidate set is chosen to be five.

Upon receipt of optimal group pattern $S_{OPGP}$ and pattern candidate set $S_{PCS}$, matching measurement unit 301 designates candidate numbers 1, 2, 3, 4, 5 included in pattern candidate set $S_{PCS}$ as matching candidate numbers $S_{MTCN}$, and delivers different sub-carrier quantities between group pattern candidates labeled with candidate numbers 1, 2, 3, 4, 5 and the optimal group pattern, and delivers matching candidate patterns 1, 2, 3, 4, 5.

Index measurement unit 302 delivers maximum different sub-carrier quantities (calculated index values $S_{MTI}$) of the respective group pattern candidates labeled with matching candidate numbers 1, 2, 3, 4, 5 shown in FIG. 12, and delivers index number $S_{MTID}$ (=2) corresponding to the maximum different sub-carrier quantity.

Index comparator 303 selects matching candidate numbers 2, 3, 4, 5, which represents the smallest maximum different sub-carrier quantity, among matching candidate numbers 1, 2, 3, 4, 5 supplied from matching measurement unit 301 as selected candidate numbers $S_{SCN}$.

Feedback determination unit 304 returns selected candidate numbers $S_{SCN}$ 2, 3, 4, 5 to matching measurement unit 301 as feedback candidate numbers $S_{SCNFB}$, because there are two or more selected candidate numbers $S_{SCN}$ and the loop count $S_{LP}$ ($S_{LP}$=0) is smaller than maximum loop count 3, and increments the value of loop count $S_{LP}$ by one ($S_{LP}$=1).

Next, matching measurement unit 301 designates feedback candidate numbers $S_{SCNFB}$ 2, 3, 4, 5 as matching candidate numbers $S_{MTCN}$, and delivers different sub-carrier quantities between the group pattern candidates labeled with candidate numbers 2, 3, 4, 5 and the optimal group pattern, and delivers matching candidate numbers 2, 3, 4, 5.

Index measurement unit 302 delivers the average different sub-carrier quantities (calculated index values $S_{MTI}$) of the respective group pattern candidates labeled with matching candidate numbers 2, 3, 4, 5 shown in FIG. 12, and delivers index number $S_{MTID}$ (=1) that corresponds to the average different sub-carrier quantity.

Index comparator 303 selects matching candidate numbers 2, 4, which represents the smallest average different sub-carrier quantity, among matching candidate numbers 2, 3, 4, 5 supplied from matching measurement unit 301 as selected candidate numbers $S_{SCN}$.

Feedback determination unit 304 returns selected candidate numbers $S_{SCN}$ 2, 4 to matching measurement unit 301 as feedback candidate numbers $S_{SCNFB}$ because there are two or more selected candidate numbers $S_{SCN}$, and because loop count $S_{LP}$ ($S_{LP}$=1) is smaller than maximum loop count 3, and increments the value of loop count $S_{LP}$ by one ($S_{LP}$=2).

Next, matching measurement unit 301 designates feedback candidate numbers $S_{SCNFB}$ 2, 4 as matching candidate numbers $S_{MTCN}$, and delivers different sub-carrier quantities between the group pattern candidates labeled with candidate numbers 2, 4 and the optimal group pattern, and delivers matching candidate numbers 2, 4.

Index measurement unit 302 delivers the minimum different sub-carrier quantities (calculated index values $S_{MTI}$) of respective group pattern candidates labeled with matching candidate numbers 2, 4 shown in FIG. 12, and delivers index number $S_{MTID}$ (=3) that corresponds to the minimum different sub-carrier quantity.

Index comparator 303 selects matching candidate numbers 2, 4, which represents the smallest minimum different sub-carrier quantity, among matching candidate numbers 2, 4 supplied from matching measurement unit 301 as selected candidate number $S_{SCN}$.

Feedback determination unit 304 returns selected candidate numbers $S_{SCN}$ 2, 4 to matching measurement unit 301 as feedback candidate numbers $S_{SCNFB}$ because there are two or more selected candidate numbers $S_{SCN}$, and because loop count $S_{LP}$ ($S_{LP}$=2) is smaller than the maximum loop count 3, and increments the value of loop count $S_{LP}$ by one ($S_{LP}$=3).

Next, matching measurement unit 301 designates feedback candidate numbers $S_{SCNFB}$ 2, 4 as matching candidate numbers $S_{MTCN}$, and delivers the different sub-carrier quantities between the group pattern candidates labeled with candidate numbers 2, 4 and the optimal group pattern, and delivers matching candidate numbers 2, 4.

Index measurement unit 302 delivers the variances of the different sub-carrier quantities of the respective group pattern candidates labeled with matching candidate numbers 2, 4 (calculated index values $S_{MTI}$) shown in FIG. 12, and delivers index number $S_{MTID}=4$ that corresponds to the variance of the different sub-carrier quantities.

Index comparator 303 selects matching candidate numbers 2, 4, which represents the smallest variance of the different sub-carrier quantity, among matching candidate numbers 2, 4 supplied from matching measurement unit 301 as selected candidate numbers $S_{SCN}$.

Feedback determination unit 304 cannot narrow down selected candidate numbers $S_{SCN}$ to one even after using the four matching indexes, but since loop count $S_{LP}$ has reached the maximum loop count of three, feedback determination unit 304 does not return selected candidate numbers $S_{SCN}$ 2, 4 to matching measurement unit 301 as feedback candidate numbers $S_{SCNFB}$, and resets the value of loop count $S_{LP}$ to "0."

There are two selected candidate numbers $S_{SCN}$, i.e., 2, 4, but loop count $S_{LP}$ (=0) is entered, so that candidate selector 305 selects an arbitrary one of selected candidate numbers 2, 4, and determines the group pattern candidate that corresponds to the selected candidate number for the quasi-optimal group pattern.

For example, when candidate number 2 is selected, candidate selector 305 designates the group pattern candidate labeled with candidate number 2 as quasi-optimal group pattern $S_{GPO}$, and delivers it together with quasi-optimal candidate number $S_{GPO}$ (=2).

The quasi-optimal group pattern is determined through the process as described above. Thus, in this embodiment, when selected candidate numbers $S_{SCN}$ cannot be narrowed down to one even if maximum loop count L is reached, an arbitrary one may be selected from selected candidate numbers $S_{SCN}$ which remain to the last, to determine quasi-optimal group pattern $S_{GPO}$.

Referring next to FIGS. 13 and 14, a description will be given of a second example of the method of determining a quasi-optimal group pattern by matching unit 213. FIG. 13 shows different sub-carrier quantities in respective group pattern candidates when the quantity K of group pattern candidates included in a pattern candidate set is chosen to be five.

Upon receipt of optimal group pattern $S_{OPGP}$ and pattern candidate set $S_{PCS}$, matching measurement unit 301 first designates candidate numbers 1, 2, 3, 4, 5 included in pattern candidate set $S_{PCS}$ as matching candidate numbers $S_{MTCN}$, and delivers different sub-carrier quantities between group pattern candidates labeled with candidate numbers 1, 2, 3, 4, 5 and the optimal group pattern, and delivers matching candidate numbers 1, 2, 3, 4, 5.

Index measurement unit 302 delivers maximum different sub-carrier quantities (calculated index values $S_{MTI}$) of the respective group pattern candidates labeled with matching candidate numbers 2, 4 shown in FIG. 14, and delivers index number of 2 that corresponds to the maximum different sub-carrier quantity.

Index comparator 303 selects matching candidate numbers 1, 3, 5, which represents the smallest maximum different sub-carrier quantity, among matching candidate numbers 1, 2, 3, 4, 5 supplied from matching measurement unit 301, and delivers them as selected candidate numbers $S_{SCN}$.

Feedback determination unit 304 returns selected candidate numbers $S_{SCN}$ 1, 3, 5 to matching measurement unit 301 as feedback candidate numbers $S_{SCNFB}$ because there are two or more selected candidate numbers $S_{SCN}$, and because loop count $S_{LP}$ ($S_{LP}=0$) is smaller than maximum loop count (=3), and increments the value of loop count $S_{LP}$ by one ($S_{LP}=1$).

Next, matching measurement unit 301 designates feedback candidate numbers $S_{SCNFB}$ 1, 3, 5 as matching candidate numbers $S_{MTCN}$, and delivers different sub-carrier quantities between the group pattern candidates labeled with candidate numbers 1, 3, 5 and the optimal group pattern, and delivers matching candidate numbers 1, 3, 5.

Index measurement unit 302 delivers the average different sub-carrier quantities (calculated index values $S_{MTI}$) of the respective group pattern candidates labeled with matching candidate numbers 1, 3, 5 shown in FIG. 14, and delivers index number "1" that corresponds to the average different sub-carrier quantity.

Index comparator 303 selects matching candidate number 3, which represents the smallest average different sub-carrier quantity, among matching candidate numbers 1, 3, 5 supplied from matching measurement unit 301 as selected candidate number $S_{SCN}$.

Since selected candidate number $S_{SCN}$ is narrowed down to one though the four matching indexes are not all used, feedback determination unit 304 does not return selected candidate number $S_{SCN}$ 3 to matching measurement unit 301, and resets the value of loop count $S_{LP}$ to "0."

Candidate selector 305 determines the group pattern candidate that corresponds to selected candidate number $S_{SCN}$ (=3) as the quasi-optimal group pattern because the value of loop count $S_{LP}$ is "0" and because there is one selected candidate number $S_{SCN}$. Here, since candidate number 3 is selected, the group pattern candidate labeled with candidate number 3 is designated as quasi-optimal group pattern $S_{GPO}$, and delivered together with quasi-optimal candidate number $S_{GPO}$ (=3).

The quasi-optimal group pattern is determined through the process as described above. Thus, in this embodiment, when selected candidate numbers $S_{SCN}$ can be narrowed down to one even before the maximum loop count L is reached, the quasi-optimal group pattern can be determined without using all (four in this embodiment) matching indexes.

According to the OFDM communication system of this embodiment, since respective sub-carriers are grouped based on the quasi-optimal group pattern closest to the optimal group pattern, the difference in quality is reduced between the communication channel quality of each sub-carrier group and the communication channel qualities of sub-carriers belonging thereto, and the modified communication channel information generated for each sub-carrier group is also commensurate with the communication channel quality of each sub-carrier. Also, link adaptation is executed in first transmitter 203 in conformity to the communication channel quality of the sub-carrier.

Further, the amount of feedback information can be reduced when the quasi-optimal candidate number for identifying the quasi-optimal group pattern closest to the optimal group pattern among previously generated group pattern candidates is transmitted to first communication device 201 on the transmission side.

While the foregoing description has shown an example in which the quasi-optimal candidate number is sent back to first communication device 201, and first transmitter 203 finds the quasi-optimal group pattern from the quasi-optimal candidate number and groups sub-carriers, information on the quasi-optimal group pattern may be sent back to first communication device 201 instead of the quasi-optimal candidate number as is the case with the first embodiment. In this event, the configurations shown in the first embodiment can be used for first transmitter 203 and first receiver 204 of first communication device 201. Accordingly, since first transmitter 203 need not find the quasi-optimal group pattern from the quasi-optimal candidate number, the configuration of first transmitter 203 can be simplified.

Third Embodiment

In the OFDM communication system of the second embodiment, a plurality of group pattern candidates have been previously provided, the one closest to an optimal group pattern is determined as a quasi-optimal group pattern, and information (quasi-optimal candidate number) for identifying the quasi-optimal group pattern is sent back from the second communication device on the reception side to the first communication device on the transmission side, thereby reducing the amount of feedback information. A third embodiment presents an example of determining the quasi-optimal group pattern using another method. Specifically, group pattern candidates which exhibit high (or low) communication channel qualities are selected in the order of sub-carrier group numbers, and a measurement is made based on the inter-group quality difference which is the difference in communication channel quality between sub-carrier groups which constitute these group pattern candidates. Then, a group pattern candidate having the largest sum of the inter-group quality differences is extracted. Such a group pattern candidate represents the largest difference in communication channel quality between sub-carrier groups, so that it is contemplated that each sub-carrier group is made up of sub-carriers which exhibit the closest communication channel qualities among a plurality of previously generated group pattern candidates. Accordingly, this embodiment determines a group pattern candidate which represents the largest sum of the inter-group quality differences as the quasi-optimal group pattern.

Figure 15:
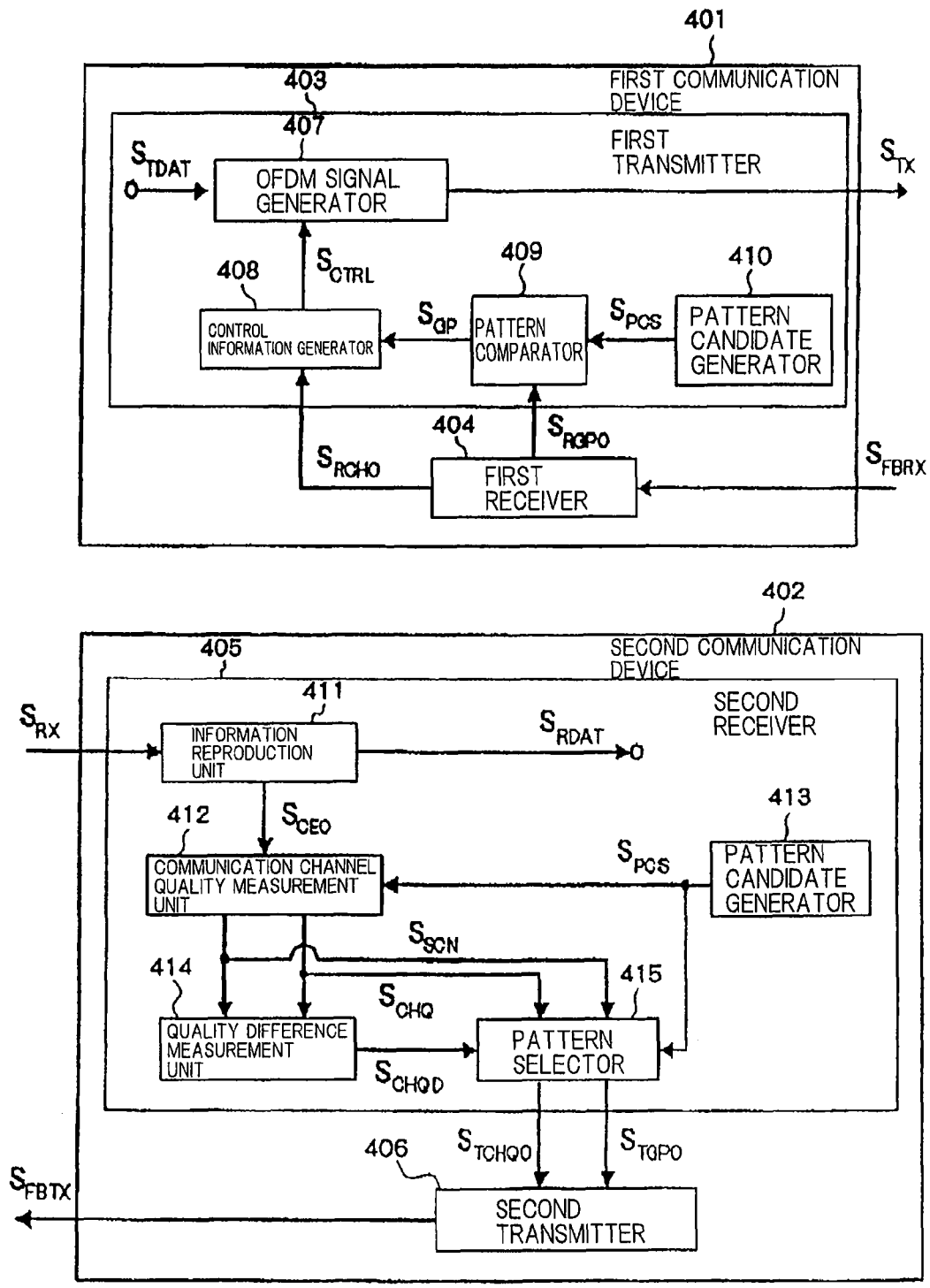
FIG. 15 is a block diagram illustrating the configuration of a third embodiment of the OFDM communication system according to the present invention.

As illustrated in FIG. 15, an OFDM communication system of the third embodiment has first communication device 401 comprising first transmitter 403 and first receiver 404, and second communication device 402 comprising second transmitter 406 and second receiver 405.

First transmitter 403 comprises OFDM signal generator 407, control information generator 408, pattern comparator 409, and pattern candidate generator 410. Second receiver 405 comprises information reproduction unit 411, communication channel quality measurement unit 412, pattern candidate generator 413, quality difference measurement unit 414, and pattern selector 415.

OFDM signal generator 407 of first transmitter 401 groups information data $S_{TDAT}$ on N (N is an integer equal to or larger than two) sub-carriers based on control information $S_{CTRL}$ supplied from control information generator 408 to generate M (M=N/n) sub-carrier groups. Also, OFDM signal generator 407 executes link adaptation specified by control information $S_{CTRL}$ supplied from control information generator 408 to set a transmission parameter for each sub-carrier group, and generates transmission OFDM signal $S_{TX}$ which is transmitted to second communication device 402. Assume herein that each sub-carrier group is labeled with group number m (m=1, 2, ..., M), respectively.

Examples of link adaptation executed by OFDM signal generator 407 include adaptive modulation control which assigns more multi-level values for symbol modulation to sub-carriers which belong to a sub-carrier group that exhibits a higher communication channel quality, or include transmission power control which allocates larger transmission power to sub-carriers which belong to a sub-carrier group that exhibits a lower communication channel quality, or the like.

Information reproduction unit 411 of second receiver 405 reproduces information data from received OFDM signal $S_{RX}$, and delivers the reproduced information data as $S_{RDAT}$. Information reproduction unit 411 also generates communication channel information $S_{CEO}$ for each sub-carrier from received OFDM signal $S_{RX}$.

Pattern candidate generator 413 generates pattern candidate set $S_{PCS}$ comprised of group pattern candidates which are labeled with candidate numbers 1 to K (K is an integer equal to or larger than one and equal to or smaller than $N!/(n!)^M$, where M=N/n) when each sub-carrier group is formed in units of n (n is an arbitrary divisor of N) from N (N is an integer equal to or larger than two) sub-carriers.

Communication channel quality measurement unit 412 measures the communication channel quality of each of the sub-carrier groups in each group pattern candidate in pattern candidate set $S_{PCS}$, respectively, based on communication channel information $S_{CEO}$ and pattern candidate set $S_{PCS}$, and selects group pattern candidates which exhibit higher communication channel qualities in the order of the first sub-carrier group to the M-th sub-carrier group. Then, communication channel quality measurement unit 412 delivers the candidate numbers of the selected group pattern candidates as selected candidate numbers $S_{SCN}$, and delivers the communication channel quality of each of the sub-carrier groups as communication channel quality information $S_{CHQ}$.

Quality difference measurement unit 414 measures an inter-group quality difference, which is the difference in communication channel quality between the respective sub-carrier groups, for each of the selected group pattern candidates based on communication channel quality information $S_{CHQ}$ supplied from communication channel quality measurement unit 412, and delivers the result as inter-group quality difference information $S_{CHQD}$.

Pattern selector 415 determines a group pattern candidate which represents the largest sum of the inter-group quality differences as a quasi-optimal group pattern among the group pattern candidates selected by communication channel quality measurement unit 412 based on selected candidate numbers $S_{SCN}$ applied from communication channel quality measurement unit 412, inter-group quality difference information $S_{CHQD}$ applied from quality difference measurement unit 414, and pattern candidate set $S_{PCS}$ generated by pattern candidate generator 413, and delivers the candidate number of the quasi-optimal group pattern as quasi-optimal candidate number $S_{TGPO}$. Further, pattern selector 415 delivers the communication channel quality of each sub-carrier group in the quasi-optimal group pattern as modified communication channel information $S_{TCHO}$.

Second transmitter 406 generates feedback information including quasi-optimal candidate numbers $S_{TGPO}$ and modified communication channel information $S_{TCHO}$, and transmits transmission feedback signal $S_{FBT}$ including the feedback information to first communication device 401.

First receiver 404 receives transmission feedback signal $S_{FBTX}$ transmitted from second transmitter 406 (received feedback signal $S_{FBRX}$), reproduces reproduced candidate number $S_{RGPO}$ corresponding to quasi-optimal candidate number $S_{TGPO}$ from this received feedback signal $S_{FBRX}$, and supplies reproduced candidate number $S_{RGPO}$ to pattern comparator 409 of first transmitter 403. Also, first receiver 404 reproduces reproduced communication channel information $S_{RCHO}$ corresponding to modified communication channel information $S_{TCHO}$ from received feedback signal $S_{FBRX}$, and supplies reproduced communication channel information $S_{RCHO}$ to control information generator 408 of first transmitter 403.

Pattern candidate generator 410 generates a pattern candidate set $S_{PCS}$ comprised of group pattern candidates which are labeled with candidate numbers 1 to K (K is an integer equal to or larger than one and equal to or smaller than $N!/(n!)^M$, where M=N/n), in a manner similar to pattern candidate generator 413 of second receiver 405.

Pattern comparator 409 compares reproduced candidate number $S_{RGPO}$ with pattern candidate set $S_{PCS}$ applied from pattern candidate generator 410 to deliver reproduced group pattern $S_{GP}$ that corresponds to the quasi-optimal group pattern.

Control information generator 408 selects optimal link adaptation for each of sub-carrier groups in the quasi-optimal group pattern based on reproduced communication channel information $S_{RCHO}$. Then, control information generator 408 supplies OFDM signal generator 407 with control information $S_{CTRL}$ including the selection result and reproduced group pattern $S_{GP}$ for grouping the respective sub-carriers.

Referring next to FIGS. 16-18, a description will be given of a method of determining the quasi-optimal group pattern in second receiver 405. Assume herein that the total quantity N of sub-carriers is eight (N=8), the quantity n of sub-carriers included in each sub-carrier group is two (n=2), and the quantity M of sub-carrier groups is four (M=4). It should be noted that the OFDM communication system of the third embodiment employs the absolute value of a communication channel gain calculated on the basis of communication channel information as the communication channel quality.

FIG. 16 is a diagram showing the value of the communication channel quality measured for each sub-carrier, and FIG. 17 is a diagram showing sub-carrier numbers included in each of sub-carrier groups in group pattern candidates, and average values of communication channel qualities for the sub-carrier groups when the quantity K of group pattern candidates in the pattern candidate set is chosen to be six. FIG. 18 in turn shows communication channel quality differences between sub-carrier groups in group pattern candidates labeled with candidate numbers 5, 6. For example, Gr#1-Gr#2 shows the communication channel quality difference between the first sub-carrier group and the second sub-carrier group.

Communication channel quality measurement unit 412 measures the communication channel quality for each of sub-carrier groups in each group pattern candidate respectively based on the communication channel information, and delivers candidate numbers 5, 6 of group pattern candidates which exhibit higher communication channel qualities in the order of the first sub-carrier group to the fourth sub-carrier group as selected candidate numbers (FIG. 17). Communication channel quality measurement unit 412 further delivers the communication channel quality of each sub-carrier group in the group pattern candidates labeled with candidate numbers 5, 6 as communication channel quality information.

Quality difference measurement unit 414 measures inter-group quality differences, which are the differences in communication channel quality between the respective sub-carriers in the group pattern candidates labeled with candidate numbers 5, 6 based on the communication channel quality information, and delivers the result as inter-group quality difference information (see FIG. 18)

Pattern selector 415 determines the group pattern candidate labeled with candidate number 6 which represents the largest sum of the inter-group quality differences, from the group pattern candidates labeled with candidate numbers 5, 6, as the quasi-optimal group pattern, and delivers candidate number 6 as the quasi-optimal candidate number.

While the foregoing description has shown an example in which numbers of group pattern candidates exhibiting higher communication channel qualities are delivered as selected candidate numbers in order beginning with the smallest sub-carrier group number, the numbers of group pattern candidates exhibiting lower communication channel qualities may be delivered as selected candidate numbers in order beginning with the smallest sub-carrier group number.

According to the OFDM communication system of this embodiment, since respective sub-carriers are grouped based on the quasi-optimal group pattern, the difference in quality is reduced between the communication channel quality of each sub-carrier group and the communication channel qualities of sub-carriers belonging thereto, and the modified communication channel information generated for each sub-carrier group is also commensurate with the communication channel quality of each sub-carrier, as is the case with the first embodiment. In addition, link adaptation is executed in first transmitter 403 in conformity to the communication channel quality of the sub-carrier.

Further, in this embodiment, the amount of feedback information can be reduced, as in the second embodiment, when group pattern candidates exhibiting higher (or lower) communication channel qualities are selected in the order of sub-carrier group numbers, a group pattern candidate representing the largest communication channel quality difference between respective sub-carrier groups is determined as the quasi-optimal group pattern among these group pattern candidates, and a quasi-optimal candidate number for identifying this quasi-optimal group pattern is transmitted to the first communication device on the transmission side.

While the foregoing description has shown an example in which the quasi-optimal candidate number is sent back to first communication device 401 such that first transmitter 403 finds the quasi-optimal group pattern from the quasi-optimal candidate number, and from groups sub-carriers, information on the quasi-optimal group pattern may be sent back to first communication device 401 as in the second embodiment, instead of the quasi-optimal candidate number. In this event, the configurations shown in the first embodiment can be used for first transmitter 403 and first receiver 404 of first communication device 401. Accordingly, since first transmitter 403 need not find the quasi-optimal group pattern from the quasi-optimal candidate number, the configuration of first transmitter 403 can be simplified.

The invention claimed is:

1. An OFDM communication system for transmitting and receiving an OFDM signal on which a plurality of sub-carrier signals are multiplexed for returning feedback information for improving communication performance from a reception side to a transmission side, said OFDM communication system comprising:

a first communication device for grouping a plurality of the subcarrier signals in units of predetermined quantities, based on the feedback information, into sub-carrier groups for transmission as the OFDM signal; and a second communication device for measuring a communication quality for each of the sub-carriers from the OFDM signal received from said first communication device, grouping the sub-carriers into sub-carrier groups based on the communication channel quality, and transmitting grouping information which is information indicative of a group pattern that represents a correspondence relationship between the sub-carrier groups and sub-carriers belonging to the sub-carrier groups, and modified communication channel information indicative of the communication channel quality for each of the subcarrier groups, to said first communication device as the feedback information, wherein:

said first communication system comprises:

a first receiver applied with a feedback signal including the feedback information and which is received from said second communication device for generating reproduced feedback information which is feedback information reproduced from the feedback signal; and a first transmitter including an adaptive controller applied with the reproduced feedback information for generating predetermined control information, and an OFDM signal generator for generating an OFDM signal for transmission to said second communication device, said second communication device comprises:

a second receiver including an information reproduction unit for receiving the OFDM signal transmitted from said first communication device to generate reproduced information data which is information data reproduced from the OFDM signal, and communication channel information which is information indicative of a communication channel quality for each of the subcarriers, and a feedback information generator for generating the feedback information from the communication channel information; and a second transmitter for transmitting a feedback signal including the feedback information to said first communication device, wherein said feedback information generator performs sub-carrier grouping for dividing a total of N sub-carriers included in one OFDM symbol into a total of M sub-carrier groups in units of n, and delivers grouping information and modified communication channel information as feedback information, where N is an integer equal to or larger than two, n is an arbitrary divisor of N, and M is equal to N/n, and said adaptive controller generates control information based on reproduced feedback information including reproduced grouping information which is grouping information reproduced from a received feedback signal, and reproduced communication channel information which is modified communication channel information reproduced from the feedback signal.

2. The OFDM communication system according to claim 1, wherein:

said second communication device groups the sub-carriers into sub-carrier groups in units of the predetermined quantities in order beginning with a sub-carrier which exhibits the highest communication channel quality, and combines an optimal group pattern indicative of a correspondence relationship between the sub-carrier groups and sub-carriers belonging to the sub-carrier groups to generate the grouping information.

3. The OFDM communication system according to claim 2, wherein:

said grouping information includes numbers given to the subcarrier groups to which the respective sub-carriers belong, said numbers being arranged in the order of numbers previously given to the sub-carriers.

4. The OFDM communication system according to claim 2, wherein:

said grouping information includes numbers previously given to the sub-carriers which belong to the sub-carrier groups, said numbers being arranged in the order of numbers given to the sub-carrier groups.

5. The OFDM communication system according to claim 1, wherein said feedback information generator comprises:

a group pattern determination unit for generating the sub-carrier groups based on communication channel information, and delivers information indicative of the sub-carrier groups as grouping information; and a communication channel estimation value re-calculation unit applied with communication channel information and grouping information to generate modified communication channel information calculated for each of the sub-carrier group based on the grouping information.

6. The OFDM communication system according to claim 5, wherein:

said group pattern determination unit distributes n sub-carriers from an $\{(m-1)n+1\}$th sub-carrier to an mn-th sub-carrier in order beginning with a sub-carrier exhibiting the highest communication channel quality to a sub-carrier group labeled with a sub-carrier group number m, among N sub-carriers based on communication channel information, to generate an optimal group pattern, and delivers the optimal group pattern as grouping information, where m is an integer which increments one by one from one to M.

7. The OFDM communication system according to claim 1, wherein said second communication device comprises:

an optimal group pattern determination unit for grouping the subcarriers into sub-carrier groups in units of predetermined quantities in order beginning with the one exhibiting the highest communication channel quality, to generate an optimal group pattern indicative of a correspondence relationship between the sub-carrier groups and sub-carriers belonging to the sub-carrier groups;

a pattern candidate generator for generating a plurality of previously set group pattern candidates equal to or less than the quantity of the group patterns which can be assumed from the total quantity N of sub-carriers and the quantity n of sub-carriers in each of the sub-carriers; and a matching unit for selecting the group pattern candidate closest to the optimal group pattern as a quasi-optimal group pattern, and delivering at least one quasi-optimal group pattern or one quasi-optimal candidate number used for identifying the quasi-optimal group pattern, where N is an integer equal to or larger than two, and n is an arbitrary divisor of N.

8. The OFDM communication system according to claim 7, wherein:

said matching unit previously sets a plurality of matching indexes used for selecting the quasi-optimal group pattern closest to the optimal group pattern from among group pattern candidates generated by said pattern candidate generator, and sequentially selects the plurality of matching indexes in accordance with priorities previously given to the matching indexes, and selects the group pattern candidate which complies with all of the selected matching indexes as the quasi-optimal group pattern.

9. The OFDM communication system according to claim 8, wherein:

said matching unit selects the group pattern candidate as the quasi-optimal group pattern at a stage at which the group pattern candidates are narrowed down to one which complies with all the selected matching indexes, and when there are two or more group pattern candidates which comply with all the matching indexes, arbitrary selects one of the two or more group pattern candidates as the quasi-optimal group pattern.

10. The OFDM communication system according to claim 8, wherein:
said matching unit measures a different sub-carrier quantity indicative of the quantity of sub-carriers which differ between each of the subcarrier groups which make up the group pattern candidates and each of the sub-carrier groups which make up the optimal group pattern, as a value indicative of the proximity of a group pattern candidate generated by said pattern candidate generator to the optimal group pattern.

11. The OFDM communication system according to claim 9, wherein:
said matching unit measures a different sub-carrier quantity indicative of the quantity of sub-carriers which differ between each of the subcarrier groups which make up the group pattern candidates and each of the sub-carrier groups which make up the optimal group pattern, as a value indicative of the proximity of a group pattern candidate generated by said pattern candidate generator to the optimal group pattern.

12. The OFDM communication system according to claim 10, wherein:
said matching indexes include at least one among an average different sub-carrier quantity which is an average of the different sub-carrier quantities, a maximum different sub-carrier quantity which is a maximum of the different sub-carrier quantities, a minimum different sub-carrier quantity which is a minimum of the different sub-carrier quantity or a variance of the different sub-carrier quantities.

13. The OFDM communication system according to claim 11, wherein:
said matching indexes include at least one among an average different sub-carrier quantity which is an average of the different sub-carrier quantities, a maximum different sub-carrier quantity which is a maximum of the different sub-carrier quantities, a minimum different sub-carrier quantity which is a minimum of the different sub-carrier quantity or a variance of the different sub-carrier quantities.

14. The OFDM communication system according to claim 7, wherein:
said second communication device incorporates information having numbers previously given to the sub-carrier groups to which the respective sub-carriers belongs and arranged, in the order of the numbers previously given to the sub-carriers, into grouping information, and transmits the resulting grouping information to said first communication device, when said grouping information includes information on the quasi-optimal group pattern.

15. The OFDM communication system according to claim 8, wherein:
said second communication device incorporates information having numbers previously given to the sub-carrier groups to which the respective sub-carriers belongs and arranged, in the order of the numbers previously given to the sub-carriers, into grouping information, and transmits the resulting grouping information to said first communication device, when said grouping information includes information on the quasi-optimal group pattern.

16. The OFDM communication system according to claim 9, wherein:
said second communication device incorporates information having numbers previously given to the sub-carrier groups to which the respective sub-carriers belongs and arranged, in the order of the numbers previously given to the sub-carriers, into grouping information, and transmits the resulting grouping information to said first communication device, when said grouping information includes information on the quasi-optimal group pattern.

17. The OFDM communication system according to claim 10, wherein:
said second communication device incorporates information having numbers previously given to the sub-carrier groups to which the respective sub-carriers belongs and arranged, in the order of the numbers previously given to the sub-carriers, into grouping information, and transmits the resulting grouping information to said first communication device, when said grouping information includes information on the quasi-optimal group pattern.

18. The OFDM communication system according to claim 11, wherein:
said second communication device incorporates information having numbers previously given to the sub-carrier groups to which the respective sub-carriers belongs and arranged, in the order of the numbers previously given to the sub-carriers, into grouping information, and transmits the resulting grouping information to said first communication device, when said grouping information includes information on the quasi-optimal group pattern.

19. The OFDM communication system according to claim 12, wherein:
said second communication device incorporates information having numbers previously given to the sub-carrier groups to which the respective sub-carriers belongs and arranged, in the order of the numbers previously given to the sub-carriers, into grouping information, and transmits the resulting grouping information to said first communication device, when said grouping information includes information on the quasi-optimal group pattern.

20. The OFDM communication system according to claim 13, wherein:
said second communication device incorporates information having numbers previously given to the sub-carrier groups to which the respective sub-carriers belongs and arranged, in the order of the numbers previously given to the sub-carriers, into grouping information, and transmits the resulting grouping information to said first communication device, when said grouping information includes information on the quasi-optimal group pattern.

21. The OFDM communication system according to claim 7, wherein:
said second communication device incorporates information having numbers previously given to the sub-carriers which belongs to the respective sub-carrier groups and arranged, in the order of the numbers previously given to the sub-carrier, into grouping information, and transmits the resulting grouping information to said first communication device, when said grouping information includes information on the quasi-optimal group pattern.

22. The OFDM communication system according to claim 5, wherein:

said group pattern determination unit comprises:

an optimal pattern determination unit for distributing n sub-carriers from an $((m-1)n+1)$th sub-carrier to an mn-th sub-carrier in order beginning with a sub-carrier exhibiting the highest communication channel quality to a subcarrier group labeled with a sub-carrier group number m, among N sub-carriers based on the communication channel information, to generate an optimal group pattern, and delivers the optimal group pattern as grouping information; and a pattern detector for generating a pattern candidate set comprised of group pattern candidates labeled with candidate numbers 1 to K, selecting a group pattern candidate which has the group pattern closest to the optimal group pattern applied thereto as a quasi-optimal group pattern, and delivering at least one quasi-optimal group pattern or one quasi-optimal candidate number k used for identifying the quasi-optimal group pattern as the grouping information, where m is an integer which increments one by one from 1 to M, K is an integer equal to or larger than one and equal to or smaller than $N!/(n!)^M$, and k is an integer equal to or larger than one and equal to or smaller than K.

23. The OFDM communication system according to claim 22, wherein:

said pattern detector comprises:

a pattern candidate generator for generating and delivering the pattern candidate set; and a matching unit applied with the optimal group pattern and the pattern candidate set for delivering at least one quasi-optimal group pattern or one quasi-optimal candidate number k used for identifying the quasi-optimal group pattern as grouping information.

24. The OFDM communication system according to claim 23, wherein:

said matching unit comprises:

a matching measurement unit applied with feedback candidate numbers, a loop count which indicates the number of times feedback is received from said feedback determination unit, the optimal group pattern, and the pattern candidate set, for designating the total of the K candidate numbers of the group pattern candidates or the feedback candidate numbers as matching candidate numbers, measuring the proximity of each of the group pattern candidates that correspond to the matching candidate numbers to the optimal group pattern, and delivering matching measurement information which includes the matching candidate numbers and measured matching values each indicative of the result of the measurement;

an index measurement unit applied with the loop count and the matching measurement information for generating a matching index set including a total of P matching indexes which are indexes for selecting the quasi-optimal group pattern and are labeled with previously arbitrarily set index numbers 1-P, for selecting the matching index which is given an (I+1)th priority as a selection index when the loop count is I, for calculating the selection index based on the matching information, and for delivering matching information which includes a calculated index value indicative of the result of the calculation and the index numbers;

an index comparator applied with the matching candidate numbers and the matching information for delivering a candidate number of a group pattern candidate which satisfies candidate selection criteria based on the selection index as a selected candidate number;

said feedback determination unit including a counter for counting the loop count and applied with the selected candidate number for determining whether or not the selected candidate number is fed back as the feedback candidate number, for incrementing the loop count by one and delivering the resulting loop count when the selected candidate number is fed back, and for resetting the loop count to zero and delivering the reset loop count when the selected candidate number is not fed back; and a candidate selection unit applied with the loop count, the selected candidate number, and the pattern candidate set, for determining the quasi-optimal group pattern, and delivering at least one quasi-optimal group pattern or one quasi-optimal candidate number k used for identifying the quasi-optimal group pattern as the grouping information, said matching measurement unit designates the candidate numbers for a total of the K group pattern candidates in the pattern candidate set as the matching candidate numbers when the loop count is zero, and designates the feedback candidate number as the matching candidate number when the loop count is equal to or larger than one, and said candidate selector delivers the grouping information only when the loop count is zero, where L is an arbitrary integer equal to or larger than zero, I is an integer from zero to L, and P is an arbitrary integer equal to or larger than L+1.

25. The OFDM communication system according to claim 24, wherein:

said feedback determination unit does not feed the selected candidate number back as the feedback candidate number when there is one selected candidate number or when the loop count I is equal to L, and feeds the selected candidate numbers back as the feedback candidate numbers when there are two or more selected candidate numbers and when I is not equal to L.

26. The OFDM communication system according to claim 24, wherein:

said candidate selection unit designates the group pattern candidate corresponding to the selected candidate number as it is as the quasi-optimal group pattern when there is one selected candidate number, and arbitrarily selects one from group pattern candidates corresponding to the selected candidate numbers and designates the one group pattern candidate as the quasi-optimal group pattern when there are two or more selected candidate numbers.

27. The OFDM communication system according to claim 1, wherein:

said second communication device comprises:

a pattern candidate generator for generating a plurality of group pattern candidates equal to or less than the quantity of the group patterns, which can be assumed from the total quantity N of sub-carriers and the quantity n of sub-carriers per sub-carrier group; and a pattern selector for selecting a group pattern candidate which represents the largest sum of inter-group quality differences, from among the group pattern candidates, as a quasi-optimal group pattern, said inter-group quality difference being indicative of a difference in communication channel quality between respective sub-carrier groups, and for delivering at least one quasi-optimal group pattern or one quasi-optimal candidate number used for identifying the quasi-optimal group pattern, where N is an integer equal to or larger than two, and n is an arbitrary divisor of N.

28. The OFDM communication system according to claim 27, wherein:
said second communication device incorporates information having numbers previously given to the sub-carrier groups to which the respective sub-carriers belongs and arranged, in the order of the numbers previously given to the sub-carriers, into grouping information, and transmits the resulting grouping information to said first communication device, when said grouping information includes information on the quasi-optimal group pattern.

29. The OFDM communication system according to claim 27, wherein:
said second communication device incorporates information having numbers previously given to the sub-carriers which belong to the respective sub-carriers groups and arranged, in the order of the numbers previously given to the sub-carrier, into grouping information, and transmits the resulting grouping information to said first communication device, when said grouping information includes information on the quasi-optimal group pattern.

30. The OFDM communication system according to claim 1, comprising:
said pattern candidate generator for generating and delivering a pattern candidate set comprised of group pattern candidates labeled with candidate numbers 1 to K; and
said group pattern selector applied with the communication channel information and the pattern candidate set for measuring communication channel qualities in M sub-carrier groups in each of the group pattern candidates labeled with the candidate numbers 1 to K, selecting a group pattern candidate including a first sub-carrier group to an M-th sub-carrier group arranged in increasing order of communication channel qualities as a selected group pattern, designating the candidate number of the selected group pattern candidate as a selected candidate number, designating a communication channel quality of each of the sub-carrier groups in each of the selected group pattern candidates as communication channel quality information, selecting a group pattern candidate which exhibits the largest inter-group quality difference as a quasi-optimal group pattern based on the communication channel quality information, said inter-group quality difference being indicative of a difference in communication channel quality between sub-carrier groups in the selected group pattern candidates, designating at least one quasi-optimal group pattern or one quasi-optimal candidate number k used for identifying the quasi-optimal group pattern as grouping information, designating the communication channel quality for each of M sub-carrier groups in the quasi-optimal group pattern included in the communication channel quality information, as modified communication channel information, and delivering the grouping information and modified communication channel information,
where K is an integer equal to or larger than one and equal to or smaller than $N!/(n!)^M$, and k is an integer equal to or larger than one and equal to or smaller than K.

31. The OFDM communication system according to claim 30, wherein:
said group pattern selector comprises:
a communication channel quality measurement unit applied with the communication channel information and the pattern candidate set, for selecting the selected group pattern candidate and the selected candidate number, measuring the communication channel quality information, and delivering the selected candidate number and the communication channel quality information;
a quality difference measurement unit applied with the communication channel quality information for measuring the inter-group quality difference in each of the selected group pattern candidates, and delivering the result as inter-group quality difference information; and
a pattern selector applied with the selected candidate number, the communication channel quality information, the inter-group quality difference information, and the pattern candidate set, for selecting the quasi-optimal group pattern, and delivering the grouping information and the modified communication channel information.

32. The OFDM communication system according to claim 30, wherein:
said group pattern selector incorporates one of numbers $m_1$ to $m_N$ previously given to the sub-carriers which belong to the respective sub-carriers groups and arranged, in the order of the numbers 1-N previously given to the sub-carriers, into grouping information, and transmits the resulting grouping information to said first communication device, when said grouping information includes information on the quasi-optimal group pattern,
where m is an integer which increments one by one from one to M.

33. The OFDM communication system according to claim 30, wherein:
said group pattern selector incorporates n of numbers 1 to N previously given to the sub-carriers which belong to the respective sub-carriers groups and arranged, in the order of the numbers $m_1$ to $m_N$ given to the subcarrier groups, into grouping information, and transmits the resulting grouping information to said first communication device, when said grouping information includes information on the quasi-optimal group pattern,
where m is an integer which increments one by one from one to M.

* * * * *